May 21, 1963 — B. VER NOOY — 3,090,058
BALL-TYPE PIPELINE SCRAPING AND BATCHING DEVICE
Filed Sept. 19, 1960 — 2 Sheets-Sheet 1
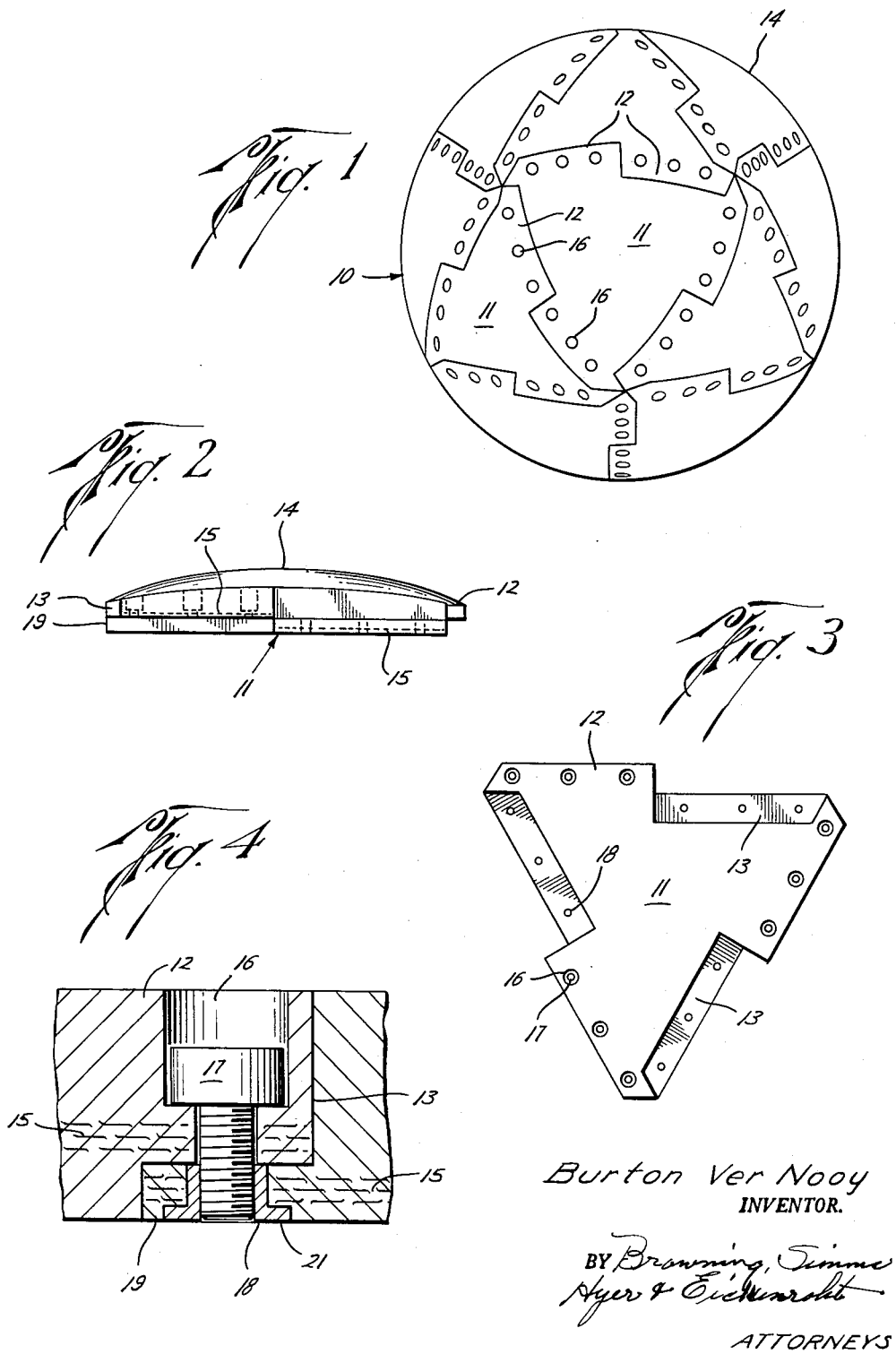
Burton Ver Nooy
INVENTOR.
BY Browning, Simmons
Ayer & Eickenroht
ATTORNEYS May 21, 1963 B. VER NOOY 3,090,058
BALL-TYPE PIPELINE SCRAPING AND BATCHING DEVICE
Filed Sept. 19, 1960 2 Sheets-Sheet 2
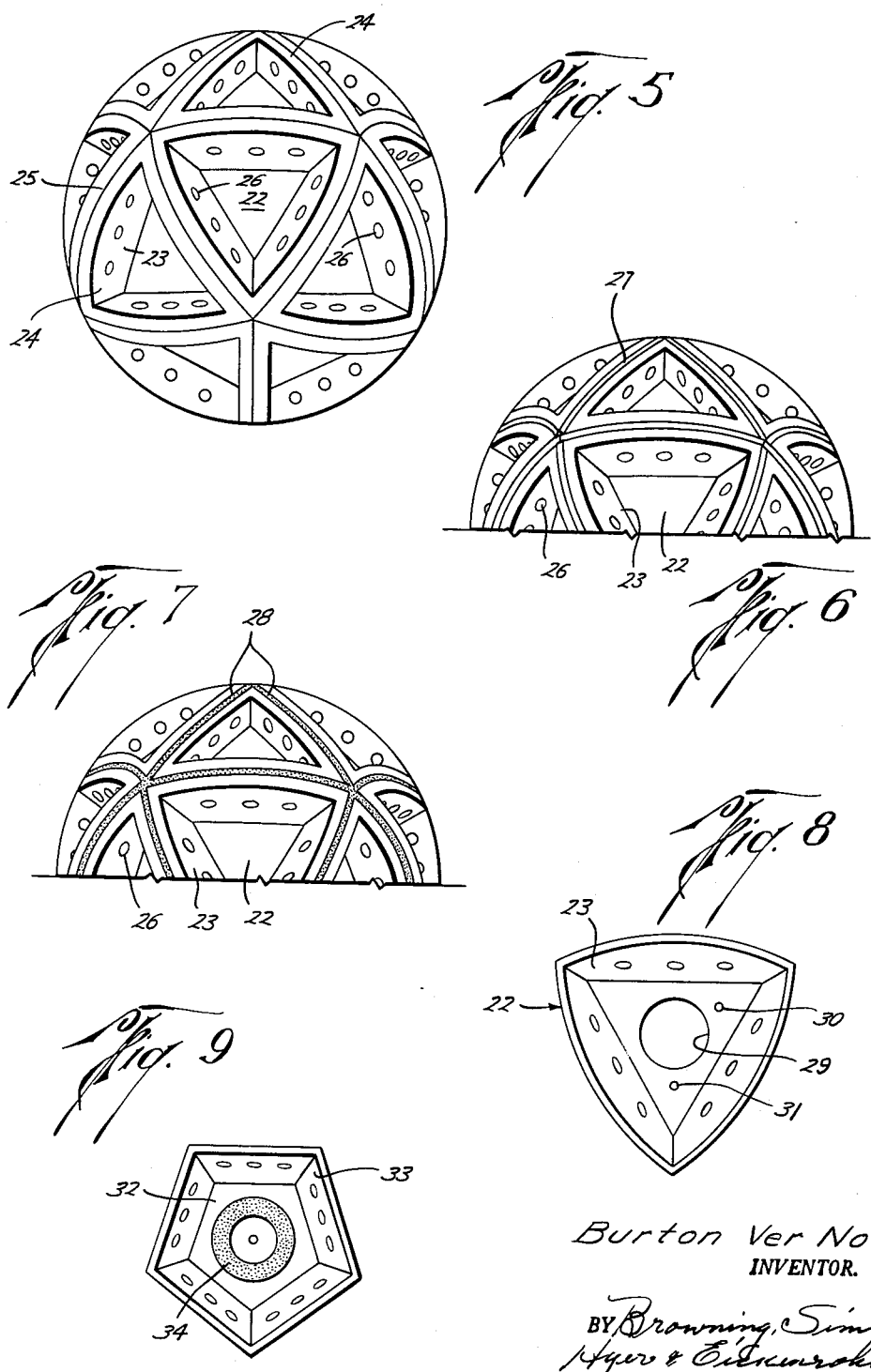
Burton Ver Nooy
INVENTOR.
BY Browning, Simmons
Hyer & Eisenroht
ATTORNEYS United States Patent Office 3,090,058
Patented May 21, 1963

3,090,058
BALL-TYPE PIPELINE SCRAPING AND
BATCHING DEVICE
Burton Ver Nooy, Tulsa, Okla., assignor to
T. D. Williamson, Inc., Tulsa, Okla.
Filed Sept. 19, 1960, Ser. No. 57,074
4 Claims. (Cl. 15—104.06)

This invention is an improved pipeline scraping and batching device, commonly called a "pig," and is particularly directed to improvements in pipeline pigs of spherical type.

In the transportation of natural gas and petroleum products through a pipeline, it is customary to separate batches of material by one or more movable pigs which are impelled through the pipeline by flow of fluid therein. The most common type of pig used for this purpose has a closed cylindrical body and a series of sealing cups arranged around the body to make sealing contact with the pipeline walls. Pigs of this type are often equipped with brushes or other scraping devices for removing deposits of sludge, wax, rust, scale or other foreign matter from the pipeline walls.

Pigs of this type frequently have several disadvantages. For example, they are often quite heavy in construction, and the weight is borne by the sealing cups on the area in contact with the bottom of the pipeline. The velocity of fluid flowing through a pipeline is frequently quite high and the interiors of the pipeline are not perfectly smooth, but usually have ridges or other rough spots at welds where various sections of the pipeline are joined together. The line passes through gate valves where its diameter is somewhat constricted and T's and other connections for branch lines occur at frequent intervals and these are often flanged on the inside of the pipeline. Sealing cups carrying the weight of the pig, sliding along the bottom of the line and across these raised welds, and coming into contact with other obstructions in the pipeline at high speed are frequently badly worn. It is also known that the radius of a turn that can be traversed by a pig of this type is a function of the length of the pig and it is occasionally desirable to have sharp turns in the pipeline.

Since a sphere would have minimum turning radius, and a ball-shaped pig would have a tendency to roll without breaking sealing contact with the pipeline walls when it comes in contact with an obstruction on one side of a pipeline and would thus tend to distribute wear evenly on all sides of the pig, it has been suggested that balls of petroleum resistant rubber be used as pigs. The advantages of minimum turning radius and evenly distributed wear are known to be obtainable with pigs of this type.

Ball pigs, however, have several inherent disadvantages. A ball pig is very difficult to remove from a scraper trap at the end of its trip through a pipeline without special lifting equipment. This is especially true of the larger sizes in which the ball may be a yard in diameter and have walls several inches thick and, as a result, has a weight in air running into the hundreds of pounds. Its smooth oil covered surface offers no point for attachment of a hook and it cannot be lifted out manually. Ball pigs also are often pressurized to prevent their collapse under the pressure differential existing across the ball in the pipeline, and it is difficult to maintain the proper pressure within the ball.

In actual use, ball pigs, especially in the larger sizes, have a tendency to allow fluid to flow by them in the line and thus do not maintain their desired position at the interface between two batches although when ball pigs are used it is customary to introduce several of them into a line to minimize leakage around the group of pigs. The smooth surface of the balls also cannot perform the scraping or cleaning action which is necessary to keep the pipeline functioning properly and it may be necessary to use the more common type of elongated pig carrying brushes or other scraping members to perform the scraping function even when balls are used to separate batches. The balls in use at present are quite expensive to manufacture and require the use of large molds with correspondingly high equipment cost.

It is an object of this invention to provide an improved ball-type pig for pipeline use in which leakage around the ball is greatly reduced.

Another object of the invention is to provide a ball-type pig which requires only relatively cheap equipment for manufacturing and is easily assembled.

Another object is to provide a ball-type pig which may be easily lifted out of a scraper trap by the use of hooks and the lifting equipment ordinarily present at such traps.

Another object of the invention is to provide a ball-type pig which performs a scraping function as well as a sealing function.

Another object is to provide a ball-type pipeline pig which will maintain its position at the interface between consecutive batches better than balls now in use.

Still another object is to provide a stiffened ball-type pig composed of many sections each equipped with stiffening means which cooperate with stiffening means in other sections to prevent sag or distortion of the ball in normal pipeline use.

Other objects, advantages and features are inherent and will become apparent upon consideration of the written specification, claims and attached drawings.

This invention stems from the discovery that the hollow ball-type pigs in use at present become at least partially filled with liquid as they traverse a pipeline and the weight of liquid within the ball causes the ball to sag slightly into oblate form. In other words, it becomes slightly pear-shaped in vertical section, taken through the ball parallel to the axis of the pipeline. As a result, the ball-type pig leaks at the top and scrubs at the bottom. This tendency to oblacity may be corrected by stiffening the ball. The ball-type pig of the present invention comprises a plurality of sections made of resilient petroleum resistant material, such as the petroleum resistant rubbers and plastics, or a springy sheet metal. Each of these sections have external surfaces of substantially spherical curvature disposed to make sealing contact with the interior of the pipeline. All or only part of the exterior surfaces of each section may have spherical curvature depending upon the pressure of the ribs or flanges described later. When the exterior is smooth, i.e., without flanges or ribs, the entire exterior surface should have spherical curvature, but when exterior ribs or outturned flanges are present, only the outer periphery of the ribs or flanges need be curved to lie substantially in the surface of a sphere.

A means for stiffening the sections, at least at their edges, is provided. The stiffening means may be layers of fabric, fiber, or other suitable material molded into and preferably bonded with the resilient petroleum resistant material, or in a preferred form it takes the form of flanges integral with each section and extending the full length of each of the edges of the section. The stiffening means of each section is cooperable with the stiffening means of other sections to stiffen the entire pig against sagging into oblate shape in a pipeline under the weight of fluid contained therein.

In one preferred embodiment flanges along the edges of each section are extended outward and are of such size and shape that their outer edges lie substantially in the surface of a sphere and the flanges, which are held together by suitable means, such as bolts extending through them, perform sealing and scraping functions against the pipeline wall in addition to stiffening the edges of the sections.

In another preferred embodiment of the invention, strips of metal shaped to conform to the outer edges of the flanges are disposed between each adjacent pair of flanges carried by adjacent sections. A metal strip disposed in this manner increases the efficiency of the scraping function and aids in stiffening the pig.

In another preferred embodiment, a row of bristles such as wire brush bristles, being disposed between each pair of adjacent flanges will thus clean the wall as the ball pig passes through the pipeline. In still another modification, a suitable non-directional brush is centrally mounted on each or on a plurality of the flanged sections which make up the pig.

The ball pig of this type may be made up of any number of different sections having an exterior surface of substantially spherical curvature. Sections of different shape may be used, but I prefer to use pieces of identical size and shape so that all sections to be assembled to make the hollow sphere may be molded in a single mold. I also prefer that these sections be equilateral for easy non-directional assembly and that the equilateral sections be either spherical triangles or spherical pentagons. Four, twenty, sixty or even more equilateral triangular sections may be assembled to form a sphere, but if a number larger than sixty is used, the labor required for assembly begins to offset the savings in the cost of molds for manufacturing the sections. I normally prefer to use twenty sections when they are equilateral spherical triangles and to use twelve sections when the pieces are to be pentagonal.

One or more of the sections used in assembling each sphere may contain an access or clean-out opening which may be closed by a suitable plug if desired. One or more of the sections may have openings in them permitting passage of liquid into or out of the pig. In one preferred form, a pair of conventional check valves is provided, both spring loaded and disposed in said openings, one to be opened by increase of fluid pressure outside of the pig, and the other to be opened when pressure of fluid inside the pig exceeds that on the exterior thereof.

The details of construction will become apparent from consideration of the following detailed description and drawings, wherein:

FIG. 1 illustrates one embodiment of device applied to the construction of a pig having a smooth exterior;

FIG. 2 is a plan of one of the substantially equilateral triangular sections used in the construction of the pig of FIG. 1;

FIG. 3 is a vertical section through the section illustrated in FIG. 2 on the line 3—3;

FIG. 4 is an enlarged view of the union of two sections illustrated in FIG. 2 showing layers of stiffening material embedded in and bonded to the petroleum resistant material of which the sections are made, and a preferred type of threaded insert molded into edges of the section to receive bolts for uniting the sections;

FIG. 5 is an embodiment of the invention illustrating a ball-type pig made of equilateral spherical triangular sections having outturned flanges;

FIG. 6 is a modification of this invention in which strips of metal are inserted between flanges of a pig similar to that illustrated in FIG. 5;

FIG. 7 is another modification of the invention in which strips of bristles are inserted between adjacent pairs of flanges of a pig similar to that shown in FIG. 5;

FIG. 8 is a detail of a spherical equilateral triangular section of a pig, showing location of an access opening, and openings for transmission of fluid to and from the interior of the pig, and suitable check valves for controlling transmission of fluid; and FIG. 9 is a detail of a pentagonal section of a pig showing one method for mounting a brush upon the section.

In the drawings, the reference numeral 10 of FIG. 1 designates generally a smooth ball-type pig. The particular pig illustrated is made up of twenty equilateral spherical triangular sections 11 shown in detail in FIGS. 2 and 3. An outer lateral flange 12 projects laterally from one-half of each of the equilateral sides of each triangular section, and the complementary half of each side has a depression 13 to receive a similar outward projecting flange of an adjacent section 11. The entire outer surface of the triangular section 11, including flange 12, has a spherical curvature. The depth of the depressions 13 and thickness of flanges 12 are so chosen that the entire exterior surface of ball pig 10 is a smooth sphere.

Layers of fabric or fiber 15 (shown only in FIGS. 2 and 3) are molded into and bonded to the resilient petroleum resistant material of which triangular sections 11 are made, and serve as a means for stiffening each of the sections, especially along overlapping edges of adjacent sections 11 comprising lateral flanges 12 where these sections are attached.

A preferred means for attaching these sections at their edges is illustrated in FIG. 4. This attachment comprises a series of counter-sunk openings 16 in each of the flanges 12 adapted to receive bolts 17 in position to engage threaded inserts 18, preferably molded into and bonded with shoulders 19 which form the bottom of each of the depressions 13. Each of the inserts preferably has an outturned flange 21 on the interior of a section 11, which cooperates with the head of bolt 17 to clamp the layers of fabric 15 contained in the flanges 12 and shoulders 19 tightly together. This construction results in cooperation of the stiffening means of each of the sections 11 with the stiffening means in adjacent sections 11 to stiffen the pig against sagging into oblate shape in a pipeline under weight of fluid contained within the pig.

The series of counter-sunk openings 16, above the head of bolts 17, may be plugged if desired to give smooth spherical surfaces to the pig. The smooth pig is substantially a perfect sphere as there are no apparent uneven portions at the lines of juncture of the various sections 11. It may be used in any of the uses where the smooth ball-type pigs are used, and has the advantage of greater stiffness resulting in substantial decrease of leakage around the ball-type pig in the pipeline.

The ball-type pig of this invention may be equipped with inlet and outlet valves for maintaining any desired pressure within the pig in a manner to be described in the pig illustrated in FIGS. 5 and 7, inclusive, and it may be partially filled with liquid so that when bouyed up by the weight of displaced fluid in a pipeline, it is substantially weightless therein. Thus, pressure drop across the pig will be greatly reduced and the pig will remain much more nearly at the interface between successive batches than the presently known spherical rubber pigs are able to do.

The smooth spherical pig just described has another special use in that it may be used as an inner liner for a hollow spherical pig, constructed as illustrated in FIGS. 5 and 9, merely by making its outer diameter equal to the inside diameter of the latter type of pig.

The ball-type pig illustrated in FIG. 5 is made up of equilateral triangular sections 22. Twenty of these sections are used in the particular modification shown in this figure, although four, twenty, sixty or even more sections may be used if desired, as described for FIG. 1. Each of these equilateral triangular sections 22 is stiffened by flanges 23 outturned at their edges and substantially perpendicular to the central triangular portions 24 of sections 22. Flanges 23 preferably are integral with the central portion of each section and are integral with each other at the corners of each flange. The outer surfaces 25 of each of these flanges lie substantially in the surface of a sphere to make sealing contact with the interior wall of a pipeline.

The central portions 24 of sections 22 may or may not be of spherical curvature, as desired, but is preferred that they be spherical, especially when an inner liner such as the pig shown in FIG. 1 is used therewith. Flanges 23 of adjacent sections 22 are fastened together by bolts 26 passing through them laterally.

A pig of this type not only performs the batching function of a plain ball-type pig, but also scrapes the inner wall of the pipeline as it passes through the line.

The scraping function of this type of pig may be improved by inserting strips of metal 27 (shown only in FIG. 6) between each pair of adjacent flanges 23 when the sections 22 are made of petroleum resistant rubber or plastic. When sections 22 are made of springy sheet metal it is preferred to make the strips 27 of rubber to add resilience. Metal strips 27, contacting the wall of the pipeline, scrape off deposits of sludge, rust and other similar types of foreign materials, more efficiently than the plain flanges 23 of resilient petroleum resistant material and arranged as shown in FIG. 5. The scraping and cleaning functions may be further improved, if desired, by the insertion of strips of brush bristles, such as wire brush bristles, between each pair of adjacent flanges 23 as shown in FIG. 7. When bristle strips are used, it is preferred that these project very little from between the adjacent pairs of flanges. About ⅛ inch is found to be satisfactory for such use.

One or more of the individual sections 22 of the spherical pig may be equipped with a clean-out opening 29 (shown only in FIG. 8) which may be plugged if desired. Also, one or more of the individual sections may be equipped with a pair of check valves 30 and 31, shown in FIG. 8. Check valves 30 and 31 are of conventional type and are preferably spring loaded. One of these check valves is disposed to admit fluid to the interior of the pig of FIG. 5 when pressure in the pipeline outside of the pig exceeds a selected pressure, and the other check valve is oppositely disposed to permit flow from the interior of the pig to the outside thereof when pressure within the pig exceeds the outside pressure by a predetermined amount.

When the clean-out opening 29 and check-valves 30 and 31 are used in a pig, as illustrated in FIGS. 5 and 7, and an inner liner, as illustrated in FIG. 1, is used in this invention, section 11 of the inner liner also has an opening 29 aligned with that in the outer section 22. The check valves are disposed both through the outer shell made up of sections 22, and the inner liner made up of sections 11.

A pig of similar construction to those illustrated in FIGS. 5, 6 and 7, may be made by the use of pentagonal sections 32 having outturned flanges 33, as shown in FIG. 9, if desired. When the pentagonal sections are used, it is preferred that twelve of them be used to form the sphere, but the construction is otherwise identical with that just described for the triangular sections of the pigs of FIGS. 5, to 7, inclusive.

To increase the scraping and cleaning function of the pigs, non-direction brushes 34 may be centrally mounted in each or in a plurality of sections 32 and 22 as shown in FIG. 9. When brushes 34 are used, the metal strips 27 may be placed between adjacent pairs of flanges or omitted, as desired.

Flanges 23 and 33, illustrated as outturned, may be turned inwardly if desired, but this is a less preferred construction. When sections having inwardly turned flanges are used, it is not practical to use an inner liner such as that shown in the pig of FIG. 1, and the assembly of the pig becomes difficult since the last pieces must be assembled by working through clean-out openings 29. For these reasons it is preferred that the outturned flanges illustrated in FIGS. 5 to 9 be used with this invention, although the stiffening function is performed equally as well by cooperating flanges, whether these are turned inward or outward.

The radially outturned flanges also are preferred because they furnish points for attachment of hooks for lifting the pig from a scraper trap. Three hooks, attached to a central hoist cable, may be inserted into upper angles of polygonal sections, and application of lifting force to the cable will tighten the grip of the hooks on the pig. A smooth pig of the type shown in FIG. 1 also is easily lifted from a scraper trap by insertion of a hook into cleanout opening 29.

From the foregoing it will be seen that this invention is one well adapted to attain all of the ends and objects hereinabove set forth together with other advantages which are obvious and which are inherent to the device.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all the matter herein set forth or shown in the accompanying drawings is to be interpreted as illustrative and not in a limiting sense.

The invention having been described, what is claimed is:

1. A spherical pipeline pig comprising in combination at least four equilateral sections of identical size and shape made of resilient petroleum-resistant material, each of said sections having an external surface of substantially spherical curvature; outturned flanges disposed along each edge of each section and extending radially outward so that the outer edge of all flanges lie in the surface of the sphere; a metallic strip disposed between each pair of adjacent flanges; and means for attaching flanges of adjacent sections together to form a hollow sphere, said flanges of each section being cooperable with flanges of other sections to stiffen the pig against sagging into oblate shape in a pipeline under weight of fluid contained therein.

2. A spherical pipeline pig comprising in combination at least four equilateral sections of identical size and shape made of resilient petroleum-resistant material, each of said sections having an external surface of substantially spherical curvature; outturned flanges disposed along each edge of each section and extending radially outward so that the outer edge of all flanges lie in the surface of the sphere; a strip of bristless disposed between each pair of adjacent flanges; and means for attaching flanges of adjacent sections together to form a hollow sphere, said flanges of each section being cooperable with flanges of other sections to stiffen the pig against sagging into oblate shape in a pipeline under weight of fluid contained therein.

3. A spherical pipeline pig comprising in combination at least four equilateral sections of identical size and shape made of resilient petroleum-resistant material, each of said sections having an external surface of substantially spherical curvature; outturned flanges disposed along each edge of each section and extending radially outward so that the outer edge of all flanges lie in the surface of the sphere; means for attaching flanges of adjacent sections together to form a hollow sphere, said flanges of each section being cooperable with flanges of other sections to stiffen the pig against sagging into oblate shape in a pipeline under weight of fluid contained therein; and a pair of check valves disposed in passageways through the wall of the hollow sphere to check flow of fluid in opposite directions.

4. A spherical pipeline pig comprising in combination at least four equilateral sections of identical size and shape made of resilient petroleum-resistant material, each of said sections having an external surface of substantially spherical curvature; outturned flanges disposed along each edge of each section and extending radially outward so that the outer edge of all flanges lie in the surface of the sphere; a scraping element disposed between each pair of adjacent flanges; and means for attaching flanges of adjacent sections together to form a hollow sphere, said flanges of each section being cooperable with flanges of other sections to stiffen the pig against sagging into oblate shape in a pipeline under weight of fluid contained therein.

References Cited in the file of this patent

UNITED STATES PATENTS

| | | |
|---|---|---|
| 818,050 | Ritchie | Apr. 17, 1906 |
| 864,544 | Kessler et al. | Aug. 27, 1907 |
| 940,457 | Gerhardt | Nov. 16, 1909 |
| 1,098,384 | Hoffman | June 2, 1914 |
| 1,299,092 | Abrahamson | Apr. 1, 1919 |
| 2,258,174 | Chawner | Oct. 7, 1941 |
| 2,513,052 | Roberts | June 27, 1950 |
| 2,668,307 | Preen | Feb. 9, 1954 |
| 2,705,419 | Chawner | Apr. 5, 1955 |

FOREIGN PATENTS

| | | |
|---|---|---|
| 363,800 | Germany | Nov. 14, 1922 |
| 1,081,046 | France | June 2, 1954 |